(12) United States Patent
Chraplyvy et al.

(10) Patent No.: US 6,381,048 B1
(45) Date of Patent: Apr. 30, 2002

(54) WAVELENGTH DIVISION MULTIPLEXED SYSTEM HAVING REDUCED CROSS-PHASE MODULATION

(75) Inventors: Andrew Roman Chraplyvy, Matawan Township, Monmouth County; Robert Meachem Jopson, Rumson Township, Monmouth County; Lynn E. Nelson, Eatontown Township, Monmouth County; Thomas A. Strasser, Warren Township, Somerset County, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/153,605

(22) Filed: Sep. 15, 1998

(51) Int. Cl.[7] .............................................. H04J 14/02
(52) U.S. Cl. ...................................... 359/124; 359/161
(58) Field of Search ................................ 359/124, 154, 359/160, 161, 173, 174, 179, 180, 188, 341

(56) References Cited

U.S. PATENT DOCUMENTS

| | | | | |
|---|---|---|---|---|
| 5,841,557 A | * | 11/1998 | Otsuka et al. | 359/124 X |
| 5,886,804 A | * | 3/1999 | Onaka et al. | 359/161 |
| 6,008,916 A | * | 12/1999 | Khaleghi | 359/161 X |
| 6,021,245 A | * | 2/2000 | Berger et al. | 359/161 X |
| 6,069,718 A | * | 5/2000 | Khaleghi | 359/161 X |
| 6,118,563 A | * | 9/2000 | Boskovic et al. | 359/124 |
| 6,124,960 A | * | 9/2000 | Garthe et al. | 359/124 X |
| 6,178,038 B1 | * | 1/2001 | Taylor et al. | 359/341 |

OTHER PUBLICATIONS

"Analysis of cross–phase modulation (XPM) effect on WDM transmission performance" by N. Kikuchi, et al., Electron. Lett. 33, 653 (1997).

"Observation of bit–error–rate impairment due to dynamic cross–phase modulation in 2.5 gbit/s WDM transmission systems with standard fiber" by T. Ogata, et al., OFC'96, vol. 1, pp. 42–44, 1996.

"Experimental investigation of Signal Distortions Induced by Cross–Phase mModulation Combined with Dispersion" by L. Rapp, IEEE Photon. Tech. Lett. 9, 1592 (1997).

"Analysis of Intensity Interference Caused by Cross–Phase Modulation in Dispersive Optical Fibers" by M. Shtaif and M. Eiselt, IEEE Photon. Tech. Lett. 10, 979 (1998).

"Degradations due to both dispersion and SPM/CPM on dispersion–managed WDM long–distance systems" by M. I. Hayee, et al., OFC'96, vol. 1, pp. 78–79, 1996.

"Cross–Phase Modulation in Fiber Links with Multiple Optical Amplifiers and Dispersion Compensators" by T. K. Chiang, et al., J. Lightwave Tech. 14, 249 (1996).

"Dependence of Cross–Phase Modulation on Channel Number in Fiber WDM Systems" by D. Marcuse, et al., J. Lightwave Tech. 12, 885 (1994).

\* cited by examiner

*Primary Examiner*—Thomas Mullen
(74) *Attorney, Agent, or Firm*—John A. Caccuro

(57) ABSTRACT

Resonances in cross-phase-modulation (CPM) impairment occur in wavelength-division-multiplexed (WDM) transmission systems, having multiple equal dispersion-length amplifier spans, when channels have an integral number of bit walk-throughs per amplifier span. The CPM resonances are reduced by mis-matching the amplifier span lengths (and/or dispersion in each span) so an integral number of bit walk-throughs do not occur in successive amplifier spans. The CPM resonances are reduced by adding different lengths of dispersion-compensating fiber to each span, using different modulation bit rates and/or clock phase delay for each channel, and using different wavelength-selective clock phase delays for each channel.

24 Claims, 7 Drawing Sheets

WAVELENGTH DIVISION MULTIPLEXED SYSTEM HAVING REDUCED CROSS-PHASE MODULATION

TECHNICAL FIELD OF THE INVENTION

This invention relates to Wavelength Division Multiplexed (WDM) systems and, more particularly, to a method of and apparatus for reducing cross-phase modulation in WDM systems.

BACKGROUND OF THE INVENTION

The current quest for higher transmission capacity per optical fiber has led to proposals for wavelength-division-multiplexed (WDM) transmission systems with more than 100 channels and channel spacing less than 50 GHz. In systems with uncompensated group-velocity dispersion, cross-phase modulation (CPM) can become the dominant nonlinear impairment as systems move to smaller channel spacing and larger number of channels. Recent studies of CPM have been made in the following areas:

dispersion-shifted fiber (DSF) [e.g., see article by N. Kikuchi, et al., Electron. Lett. 33, 653 (1997)], standard single-mode fiber (SMF) [e.g., see article by T. Ogata, et al., OFC'96, vol. 1, pp. 42–44, 1996, article by L. Rapp, IEEE Photon. Tech. Lett. 9, 1592 (1997), and article by M. Shtaif and M. Eiselt, IEEE Photon. Tech. Lett. 10, 979 (1998)], and non-zero DSF [e.g., see article by M. I. Hayee, et al., OFC'96, vol. 1, pp. 78–79,= 1996].

These studies have investigated the penalty as a function of channel power, channel spacing, and polarization. Resonances in CPM have been observed on a continuous wave (cw) probe as the sinusoidal modulation frequency of the pump was varied [e.g., see article by T. K. Chiang, et al., J. Lightwave Tech. 14, 249 (1996)].

The CPM impairment arises in a WDM system in the presence of the Kerr nonlinearity and group-velocity dispersion. The nonlinearity causes amplitude variation in signals to induce phase distortion on co-propagating channels. The group-velocity dispersion converts this phase distortion into amplitude distortion that can impact receiver sensitivity. This impairment is more commonly seen in amplitude-shift-keyed systems but can also be observed in angle-modulated systems that exhibit variation in signal amplitudes. The phase distortion occurs most strongly at the beginning of each amplifier span where the optical powers are high. In general, different wavelength channels have different group velocities, causing bits to walk through each other during transmission. This walk-off effect can reduce and virtually cancel the phase distortion induced by CPM if the pulses pass through each other sufficiently rapidly that during the course of the overlap, the power loss due to fiber attenuation is small [e.g., see article by D. Marcuse, et al., J. Lightwave Tech. 12, 885 (1994)]. This cancellation decreases as the channel spacing is reduced owing to the concurrent decrease in group-velocity difference. Cancellation of the CPM-induced phase shift will also be incomplete if pulses in adjacent channels partially overlap at the start of a span [see previously referenced Marcuse article].

There is a continuing need to more fully understand the impact of CPM in WDM systems and to devise techniques to effectively eliminate it or to cancel out its effects.

SUMMARY OF THE INVENTION

Our invention is directed to a method of and apparatus for reducing the resonances in cross-phase-modulation (CPM) impairment that occur in wavelength division-multiplexed (WDM) transmission systems having multiple amplifier spans.

Considering only a single span for the moment, deleterious phase distortions will be induced on a signal at those points of the signal that enter the fiber span coincident with large amplitude fluctuations in the copropagating signals. Large amplitude fluctuations in the interfering signals, whether occurring at clock transition points in on/off-keyed systems or arising from nonlinearity, generally will be spaced at multiples of the clock period. As the signal and interfering signals propagate in the fiber, chromatic dispersion will cause them to "slide" past each other.

In systems containing more than one span, the phase distortion induced on a signal in the first span can be exacerbated if the part of the signal containing that distortion enters the second span coincident with another large amplitude fluctuation in the interfering signals. This can occur if the signals slide past each other by an integral number of interfering signal bits during transmission over the first fiber span and subsequent components. That is, the induced phase distortion on a signal caused by an interferer will be enhanced when $nT=\Delta\tau$, where T is the bit period of an interfering signal and n is an integer, and $\Delta\tau$ is the difference in propagation delay for the two signals. Included in $\Delta\tau$ is all slippage that occurs between the start of one fiber span and the start of the next fiber span.

We have determined that in a two-channel, two-span WDM system, if one scans the bit-rate of one of the channels, any CPM impairment observed on the other channel will be worse at bit-rates for which the above relationship holds. In other words, a resonance will occur in the CPM penalty at these bit-rates. These CPM resonances will also be observed if the bit-rates are held constant and the channel separation is scanned. In general, the CPM impairment increases with increases in the number of interfering channels that are simultaneously in resonance with a particular signal channel. One aspect of our invention is directed to reducing such CPM resonances by mis-matching the amplifier span lengths (and/or dispersion-length product in each span) so that an integral number of bit walk-throughs do not occur between adjacent channels in successive amplifier spans.

More particularly, our invention is directed to a WDM system that includes a transmitter for sending WDM signal channels over a plurality of serially connected amplified communication spans to a receiver, each span including an optical amplifier for receiving the WDM signal channels and transmitting it over a length of fiber to an adjacent span or the receiver, and wherein at least one span comprises means for setting the clock phase difference (the time delay between bit transition times of two channels) at the fiber input between at least one pair of adjacent WDM signal channels to be different from the clock phase difference that the same channel pair has at the fiber input in at least one other span.

According to one feature, the clock phase difference of at least one channel pair at the fiber input of a plurality of spans is made adjustable and the clock phase difference at the fiber input in each span is set to be different from the clock phase difference at the fiber input in any other span. In another feature the clock phase difference of each of the channel pairs at the fiber input of a plurality of spans is made adjustable and set differently in each span.

Other techniques for reducing CPM include adding different lengths of dispersion-compensating fiber to each span, using different modulation bit rates and/or clock phase delay for each channel, and using different wavelength-selective phase delays for each channel.

If the bit-rate and channel spacing are known when designing a system, then resonances between pairs of spans can be avoided by changing the delay differences between channels.

GENERAL DESCRIPTION

Figure 1:
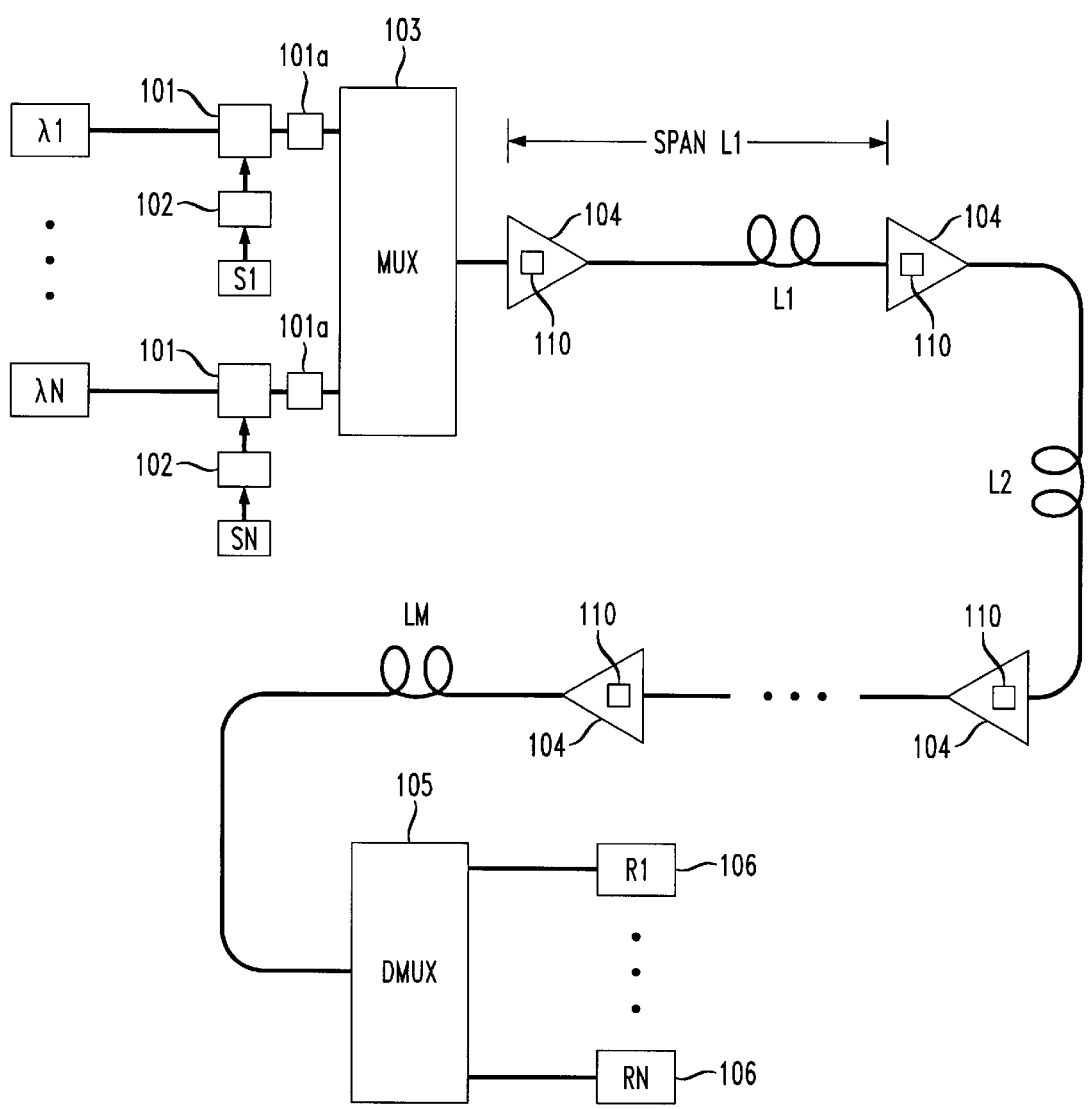
FIG. 1 shows an illustrative block diagram of a Wavelength Division Multiplexed (WDM) system in which our apparatus for, and method of, reducing cross-phase modulation (CPM) may be utilized.

In a single span Wavelength Division Multiplexed (WDM) system, deleterious phase distortions will be induced on a signal at those points of the signal that enter the fiber span coincident with large amplitude fluctuations in the copropagating signals. Large amplitude fluctuations in the interfering signals, whether occurring at clock transition points in on/off-keyed systems or arising from nonlinearity, generally will be spaced at multiples of the clock period. As the signal and interfering signals propagate in the fiber, chromatic dispersion will cause them to "slide" past each other. The difference in propagation delay for the signal and the interfering channel will be designated $\Delta\tau$, and contributes to the clock phase difference between the two channels.

In systems containing more than one span, the phase distortion induced on a signal in the first span can be exacerbated if the part of the signal containing that distortion enters the second span coincident with another large amplitude fluctuation in the interfering signals. This can occur if the signals slide past each other by an integral number of interfering signal bits during transmission over the first fiber span and subsequent components. That is, the induced phase distortion on a signal caused by an interferer will be enhanced when $nT=\Delta\tau$, where T is the bit period of an interfering signal and n is an integer. Included in $\Delta\tau$ is all slippage that occurs between the start of one fiber span and the start of the next fiber span. For instance, if a span contains only transmission fiber and an amplifier, then $\Delta\tau=(D_f L_f + D_a L_a)\Delta\lambda$, where $\Delta\lambda$ is the wavelength separation between the signal and the interfering channel, D and L are the fiber dispersion and length, respectively, (also referred to herein as dispersion-length product) and the subscripts "f" and "a" denote transmission fiber and amplifier fiber, respectively.

We have determined that in a two-channel, two-span WDM system, if one scans the bit-rate of one of the channels, any CPM impairment observed on the other channel will be worse at bit-rates for which the above relationship holds. In other words, a resonance will occur in the CPM penalty at these bit-rates. These CPM resonances will also be observed if the bit-rates are held constant and the channel separation is scanned. In general, the CPM impairment increases with increases in the number of interfering channels that are simultaneously in resonance with a particular signal channel. Systems containing more than two spans offer the possibility of the resonance condition being met simultaneously in more than one span. As the number of spans in resonance for a given channel increases, the CPM impairment for that channel will increase.

Our invention is directed to reducing such CPM resonances by mis-matching the amplifier span lengths (and/or dispersion-length product in each span) so that an integral number of bit walk-throughs do not occur between adjacent channels in successive amplifier spans. This can be achieved, for instance, by adding dispersive fiber to a span to bring the span out of resonance. An alternative method for removing a resonance condition of a span is to separate the various channels in a wavelength demultiplexer, add delay to each channel and recombine the channels in a multiplexer.

If the bit-rate or channel spacing of a WDM system is not known, then one cannot apply the technique described above since there will always be some bit-rate/channel spacing combinations for which resonances exist. Instead, one can reduce the CPM impairment by reducing the number of resonances that can possibly exist for a given channel. For instance, if the spans are all identical, then the resonance condition can be met simultaneously for all spans and a greatly multiplied CPM impairment will result for some combinations of bit-rate and channel spacing. This possibility can be avoided by adding or subtracting dispersion or other sources of differential delay from amplifier spans.

It is also possible to reduce significantly the impairment of CPM resonances without making every span different. As an example, consider a two-channel system containing six identical spans, all satisfying the condition, $nT=\Delta\tau$ for some integer n. The peak phase distortion induced in all six spans will occur at the same clock positions in the signal. If span 3 is now changed so that it satisfies the condition $(n+0.5)T=\Delta\tau$, the peak phase distortion induced on the signal by span 4 will occur halfway between that induced in the first 3 spans. Moreover, since span 4 still satisfies $nT=\Delta\tau$, the location of the peak phase distortion induced by span 5 will be coincident with that induced in span 4 rather than with the distortion induced in the first three spans. Similarly, the distortion induced in span 6 will also coincide with the distortion induced in span 4. Thus in this six-span system, by changing the $\Delta\tau$ in one span, we change from having six peak distortions coincident with each other to having two positions each comprised of three coincident peak distortions. We have observed that CPM impairment can be reduced significantly by changing the resonance condition of one or a few spans rather than of all the spans.

DETAILED DESCRIPTION

FIG. 1 shows an illustrative block diagram of a WDM system in which our apparatus for, and method of, reducing cross-phase modulation (CPM) may be utilized. This CPM problem increases when the separation between adjacent wavelength channels decreases, as occurs when the number N of wavelength channels is increased in a WDM system with fixed bandwidth, and, conversely, CPM decreases when the separation between these wavelength channels increases.

The system is shown to include N optical sources, λ1–λN, each wavelength being modulated by a data signal in an associated modulator 101. Each data signal is generated at an associated data signal source S1–SN. It should be noted that the modulators 101 might utilize either a return-to-zero or non-return-to-zero type modulation. The CPM impairment can be observed irrespective of which of these two types of modulation is used.

In accordance with one aspect of the present invention, each data signal may utilize a data signal delay circuit 102 for setting a predetermined delay, or phase shift, to its data signal. Decreases in the effects of CPM on the WDM system, such as the effect on the bit error rate (BER), can be obtained if each delay circuit 102 is set to a different amount of delay. The resulting decorrelation of the modulation signals tends to randomize the CPM accumulation, and thereby reduces the build up of CPM in the WDM system. If desired, a single clock source (not shown) together with the delay circuits 102, can be used to generate a group of clock signals having different delays for use by the data signal sources S1–SN.

The outputs of the modulators 101 are multiplexed together in multiplexer 103 to form a WDM signal. The WDM signal is sent over one or more fiber optic spans, L1–LM, each span including an optical amplifier and a length of optical fiber. The output of the last span M is received at demultiplexer 105, demultiplexed and each modulated wavelength λ1–λN is detected in an associated optical receiver 106. As will be discussed in a later paragraph, the CPM exhibits resonances in WDM systems which have equal dispersion in each of the spans L1–LM. An undersea optical system is one type of system that typically has equal spans and dispersion. In the following paragraphs it is assumed that the WDM system has equal dispersion-length products in the spans. (e.g., the fiber in each span having the same length and same dispersion)

In accordance with another aspect of our invention, a wavelength delay circuit 110 is utilized, ideally, in each span L1–LM to adjust the delay. In our example, the delay circuit 110 is optimally located between amplification stages in the optical amplifier 104, although it can also be placed at any location along the fiber optic span. Each of the delay circuits 110 is set to introduce a different amount of delay for each wavelength (channel). As a consequence, at the input to the fiber span the clock phase difference for any pair of channels is unequal to that of any other pair of channels. This results in a reduction in the CPM resonances at the receivers 106 of the WDM system.

Figure 2:
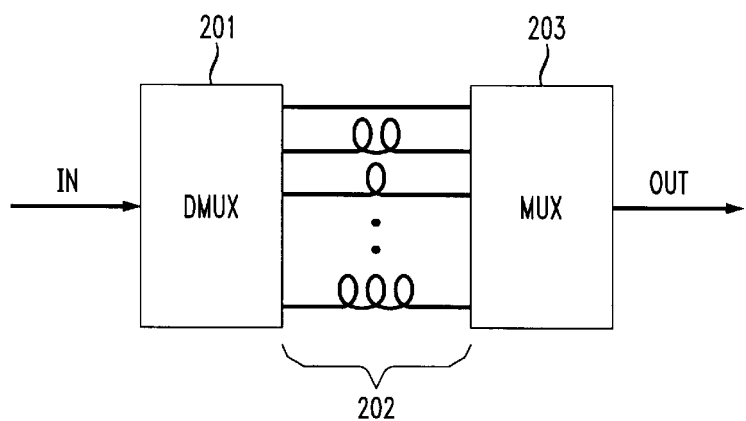
FIG. 2 shows an illustrative block diagram of a wavelength delay circuit.

With reference to FIG. 2, the delay circuits 110 may, illustratively, be implemented, as decorrelation circuits. The decorrelation circuit includes a demultiplexer 201, a different length of fiber 202 for each wavelength, and a multiplexer 203. The WDM signal is demultiplexed and each wavelength channel is delayed so that adjacent channels have a non-integral number of bit walk-throughs in the amplifier span (amplifier plus fiber plus delay circuit) (as will be discussed in a later paragraph). This delay is produced by using a different length of fiber for each wavelength. Since each wavelength is delayed by a different amount, the channel modulations are decorrelated when they are recombined in multiplexer 203. As a result, resonances in the CPM may be significantly reduced in the WDM signal. The multiplexer 203 and demultiplexer 201 may be implemented using a variety of well known circuits including a Mach-Zehnder interferometer, a waveguide grating router (WGR), etc.

Figure 3:
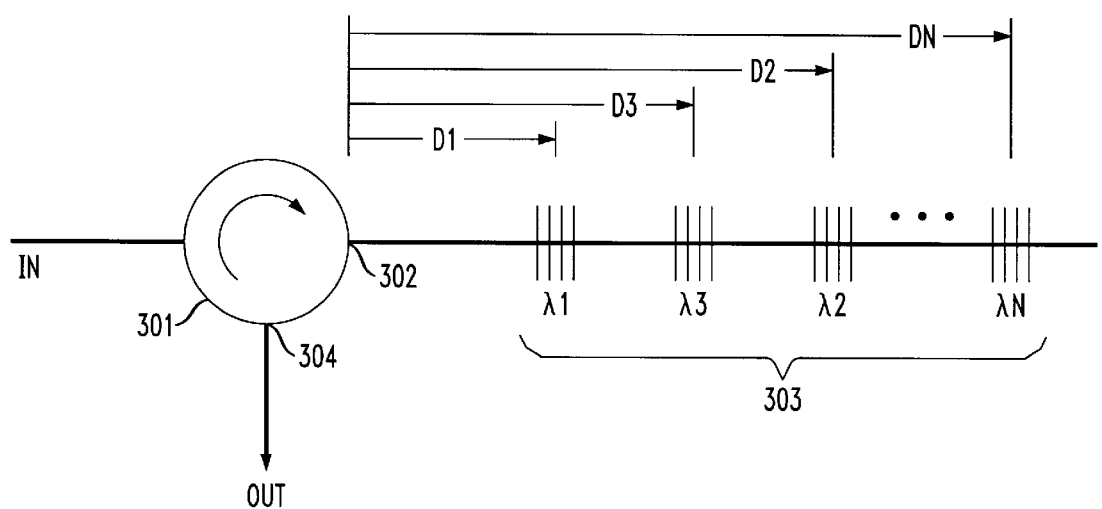
FIG. 3 shows another illustrative embodiment of a wavelength delay circuit.

Shown in FIG. 3, is another type of circuit that may be utilized in the wavelength delay circuits 110. As shown, the circuit includes a circulator 301 and a plurality of fiber grating reflectors 303, one for each wavelength λ1–λN of the WDM signal. The incoming WDM signal to circulator 301 exits port 302 and each wavelength λ1–λN of the WDM signal is reflected by a different one of the fiber grating reflectors 303. The distance between each fiber grating reflectors 303 and the circulator 301 (e.g., D1) is set so that adjacent channels have a non-integer number of bit walk-throughs in the amplifier span (amplifier plus fiber plus delay circuit). That is, the different distances D1–DN are selected to insure that the channel modulations are decorrelated when they enter the next fiber length after being outputted from output port 304. If desirable, a coupler may be substituted for the circulator 301.

It should also be noted that CPM can be reduced in a multi-span WDM system if each span is made to have a different dispersion. This can be accomplished by adding different lengths to each span. Since the dispersion characteristic of typical transmission fiber is low, it is more desirable to use high-dispersion fiber such as dispersion-compensating fiber for this purpose. If the length of each span must be the same, then different dispersion can be accomplished using transmission fiber having different dispersion characteristics for each span.

According to other aspects of our invention, the build-up of CPM can also be reduced by using or setting the wavelength separation to be different between some or all of the adjacent pairs of wavelengths of the WDM signal. Additionally, CPM can further be reduced if two or more of the wavelength channels utilize different data modulation bit rates, where the data rates are not integer multiples. Moreover, if adjacent wavelength channel sources λ1–λN, are polarized orthogonal to each other (using polarizers 101a), the CPM can be further reduced. This can be accomplished by having all odd wavelengths be polarized orthogonal with respect to the even wavelengths.

As previously noted, the desire for higher transmission capacity per fiber has led to the development of WDM systems, e.g., such as FIG. 1, with increased number of channels and decreased channel spacing. In such systems with uncompensated group-velocity dispersion, the cross-phase modulation (CPM) has often become the dominant nonlinear impairment. This CPM impairment arises in an amplitude-shift keyed WDM system when signals induce phase distortion on co-propagating channels and group-velocity dispersion converts this phase distortion into amplitude distortion. Impairment from CPM can also be observed in an angle-modulated WDM system in which amplitude variation arises from imperfect modulation, chromatic dispersion, and other effects. As will be discussed in the following paragraphs, resonances in CPM impairment occur when the channel spacing, fiber dispersion, and amplifier span lengths are such that channels have an integral number of bit walk-throughs per amplifier span.

Two-channel CPM Measurements

Figure 4:
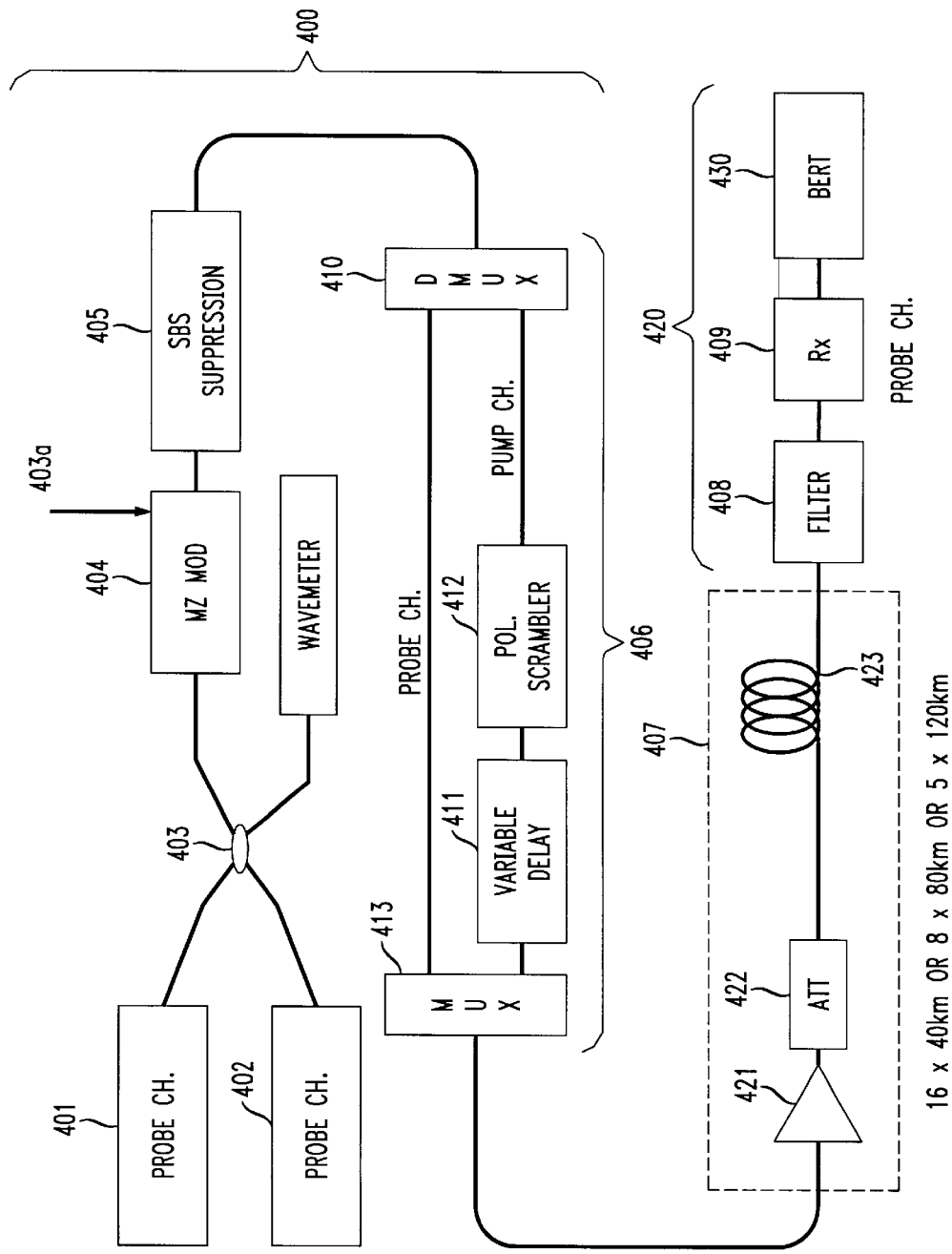
FIG. 4 shows an illustrative two-channel system used to measure two-channel CPM.

To isolate CPM and understand the resonances, we used a simple illustrative two-channel system, shown in FIG. 4. The setup included a transmitter unit 400, optical fiber span unit 407, and a receiver unit 420. The transmitter unit 400 contained a weak probe channel 401, −10 dBm, and used a pump channel 402 having 10-dB higher power to represent the remaining channels in a multi-channel system. The 1555-nm probe channel 401 wavelength was fixed, while the pump channel 402 wavelength was scanned. The two channels were combined, in combiner 403, and modulated, in modulator 404, using a 2.5-Gb/s NRZ ($2^{31}$−1 PRBS) data signal 403a. The output of the modulator 404 then passed through a phase modulator 405 driven at 50 MHz and 155 MHz for stimulated Brillouin scattering (SBS) suppression. An adjustable, differential time delay 406 decorrelated the channel modulations, and the pump channel 402 was polarization scrambled. The time delay 406 was implemented (in a similar manner as the apparatus of FIG. 2) using a demultiplexer 410, a variable delay 411, and scrambler 412 for the pump channel, and a multiplexer 413 to recombine the probe and pump channels. The use of polarization scrambler 412 and its inclusion in the adjustable, differential time delay 406 were matters of experimental convenience.

The illustrative optical fiber span unit 407 contained sixteen nominally 40-km spans, 423, of single-mode fiber (SMF) for a total length of 624 km. Each span included an amplifier 421, an attenuator 422, and a length of fiber 423. Span lengths were matched to within ±4%; the average span length was 39.0 km. (In this discussion we will use the nominal 40-km span length for simplicity.) The system could be effectively converted from 16 spans of 40 km (16×40 km) to 8 spans of 80 km or 5 spans of 120 km (+40 km) by attenuating (using attenuator 422) the input powers of appropriate 40-km spans to linear levels. In the 16×40-km system, +14 dBm was launched into each span. In the 8×80-km system, +14 dBm and +5 dBm were alternately launched into 40-km spans, while in the 5×120-km system, +14 dBm, +5 dBm, and +5 dBm were launched into successive sets of three spans.

After transmission, the receiver unit 420 received the output of the last span. The received signal was filtered, in filter 408, and detected in receiver 409, and the bit error rate was measured in bit error rate test set (BERT) 430. The filter 408 was a 0.6-nm bandwidth filter used to select the probe signal. The optically-preamplified receiver 409 had a back-to-back sensitivity of −43 dBm and exhibited a 1-dB penalty for low-power (+3 dBm), single-channel transmission through the 624-km system.

Figure 5:
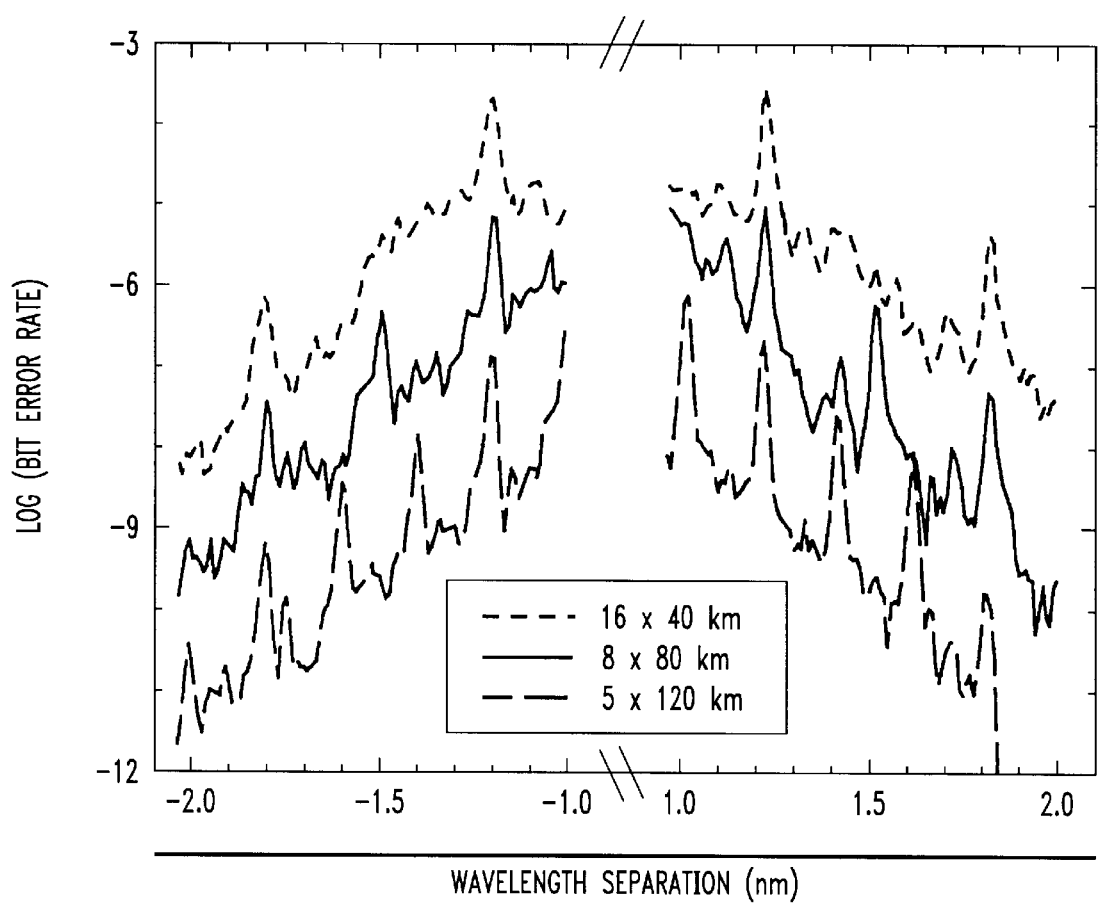
FIG. 5 shows, for the system of FIG. 4, a plot of the probe channel bit-error rate (BER) versus wavelength separation for the three amplifier span lengths of 40, 80, and 120 km.

Using a received optical power of −36 dBm, the bit-error-rate (BER) of the probe channel was measured, at BERT 430, as the wavelength of the pump channel was scanned. FIG. 5 shows a plot of the probe channel BER versus wavelength separation for the three amplifier span lengths of 40, 80, and 120 km. (For these curves the decision point was set to minimize the BER at a wavelength separation of 1.65 nm, which was off resonance, and the initial clock-offset (clock phase difference) between pump and probe channels was 35 ps.). For clarity, the center and bottom curves have been scaled by 0.1 and 0.01, respectively. (Note break in abscissa at center of plot.)

The curves show sharp resonances in which the BER increases by a factor of about 100 i.e., peak to valley range of 2 units on the log (BER) scale]. These resonances are separated by 0.6 nm, 0.3 nm, and 0.2 nm for the system configured with respective span lengths of 40 km, 80 km, and 120 km. It can be easily seen that the resonances are spaced by pump-probe wavelength separations that provide an integral number of bit walk-throughs per amplifier span: $\Delta\lambda = mT/DL$. Here m is an integer, T is the bit period (402 ps), D is the fiber dispersion (17.1 ps/nm/km) and L is the amplifier span length (average lengths: 39, 78, or 117 km).

As expected, the background (off-resonance) cross-phase modulation penalty decreases as the wavelength separation increases due to faster walk-through of the bits in the adjacent channels.

Figure 6:
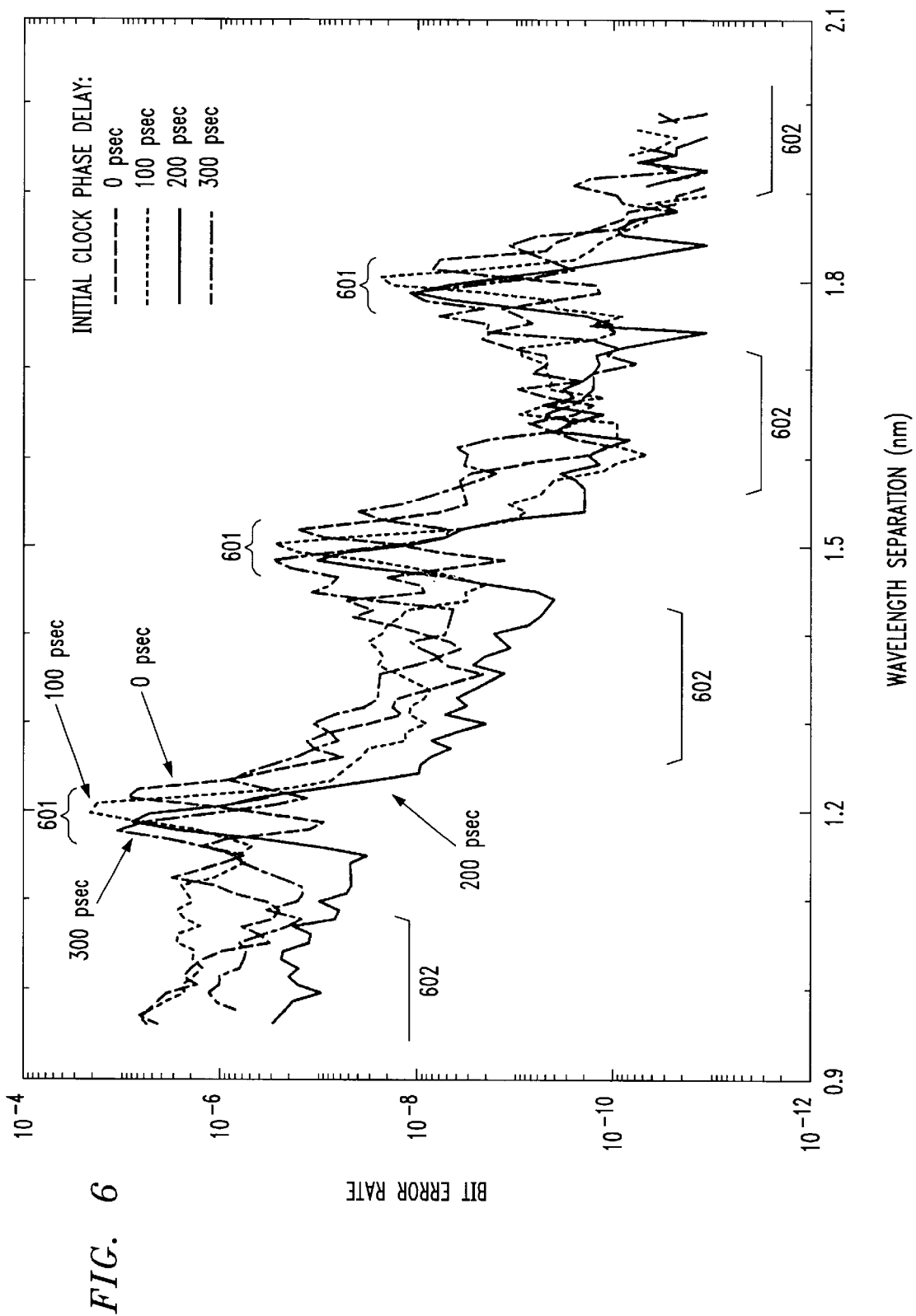
FIG. 6 shows a BER of the probe channel after non-return-to-zero (NRZ) transmission through 8×80 km of standard fiber as the separation between pump and probe is varied for four different initial clock phase differences between pump and probe channels.

FIG. 6 shows the BER of the probe channel (1554.31 nm) after NRZ transmission through 8×80 km of standard fiber as the wavelength separation between pump and probe is varied for various initial clock phase differences (e.g., 0, 100, 200, and 300 ps) between pump and probe channels. Input powers to the amplifier spans were +14/+5 dBm and received power was −36 dBm. As shown in FIG. 6, when the clock phase difference between the two channels was varied at the system input (using variable delay 411), the resonances persisted, exhibiting small shifts in amplitude, position, and shape. Note that by determining the variation in clock phase differences at the fiber input of two or more spans, the presence of a resonance can be anticipated and the initial transmitter phase could be adjusted to improve the system performance (for example, the system BER).

A system containing channels with varying clock phases will average over these resonances. Although the wavelength separations at which the resonances occur, 601, have a small spread (~0.04 nm) for the various initial clock phase differences, there is an overlapping region, 602, of low BER for all four initial clock offsets. This region occurs when the dispersion, span length, and channel spacing provide a non-integer number of bit walk-throughs per amplifier span. The condition for avoiding resonances can be expressed as $(n+0.25)T < DL\Delta\lambda < (n+0.75)T$. Here, as previously, n is an integer, T is the bit period, D is the fiber dispersion, L is the amplifier span length, and $\Delta\lambda$ is the wavelength separation between channels. For systems containing fibers of different dispersions, DL, the dispersion-length product, can be replaced by the integral of the dispersion over the length of an amplifier span.

Resonances persisted when the transmitter was changed so as to provide 50%-duty-factor return-to-zero modulation. The resonances were decreased by reducing the PRBS pattern length reducing the number of high power spans in the system, or mis-matching the amplifier span lengths and/or dispersion in the spans. It should also be noted that CPM can be further reduced by making channel pairs orthogonal.

Equal Versus Unequal Span Lengths

Figure 7:
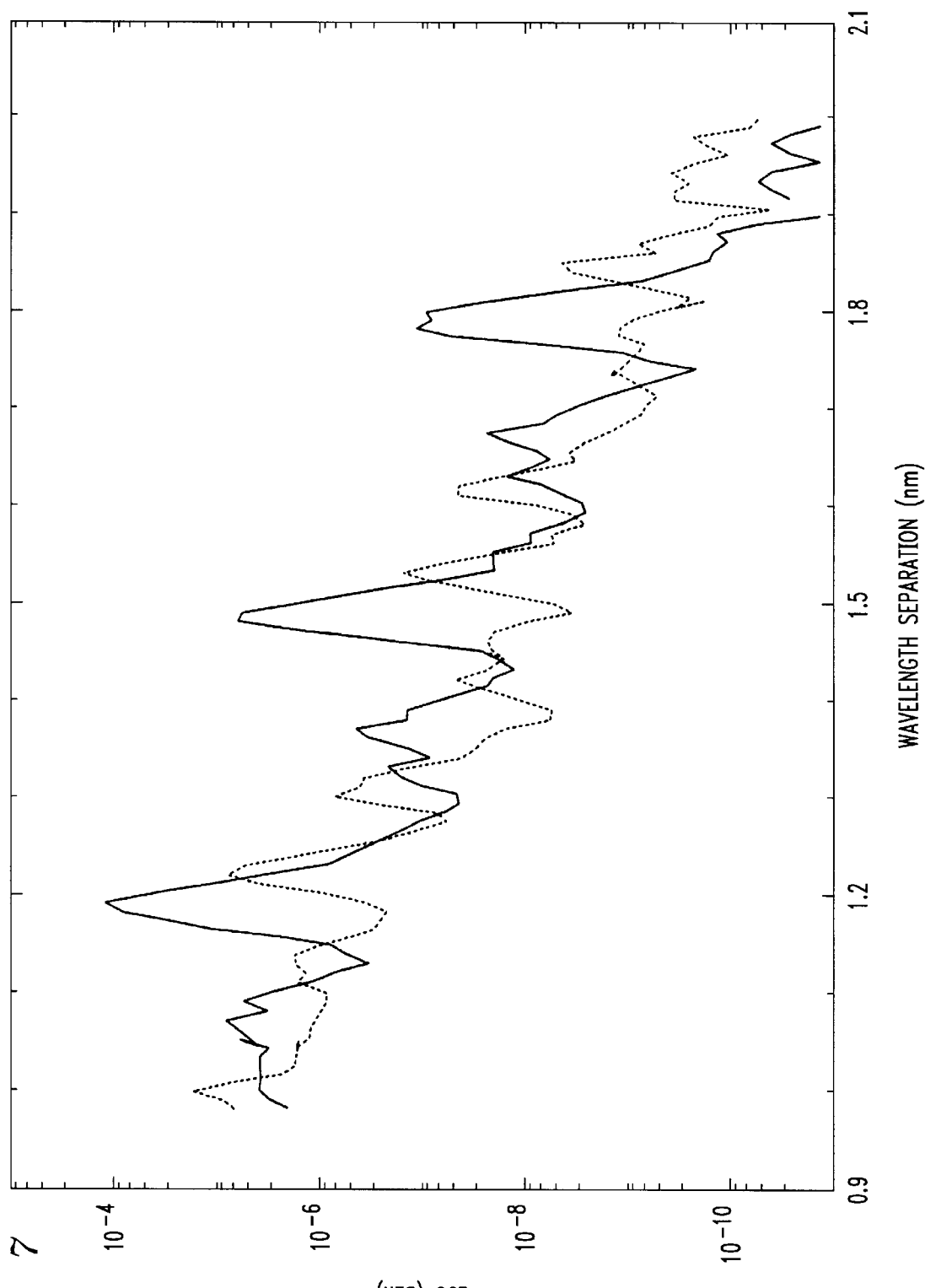
FIG. 7 shows a comparison of the resonances in the 8×80-km system when the spans were matched at 80 km versus when the spans had unmatched lengths.

FIG. 7 shows a comparison of the resonances in the 8×80-km system when the spans were matched at 80 km (solid line) versus the lower resonances when the spans had unmatched lengths of 68.4, 74.2, 77, 83.5, 88.5, 86, 71.6, and 81 km (dotted line). (For both curves the initial clock phase difference between pump and probe channels was 200 ps.)

It should be noted that changing the resonance condition of one or a few spans (rather than in all spans) can also reduce the CPM impairment. This occurs because unequal clock-phase differences at the inputs to these one or more spans result in peak phase distortions that are not coincident and thus do not cause resonances. Note that by determining the variation in clock phase differences at the fiber input of two or more spans, the presence of a resonance can be anticipated and the difference in propagation delay, $\Delta\tau$, could be adjusted to improve the system performance.

Five-channel CPM Experiment

Figure 8:
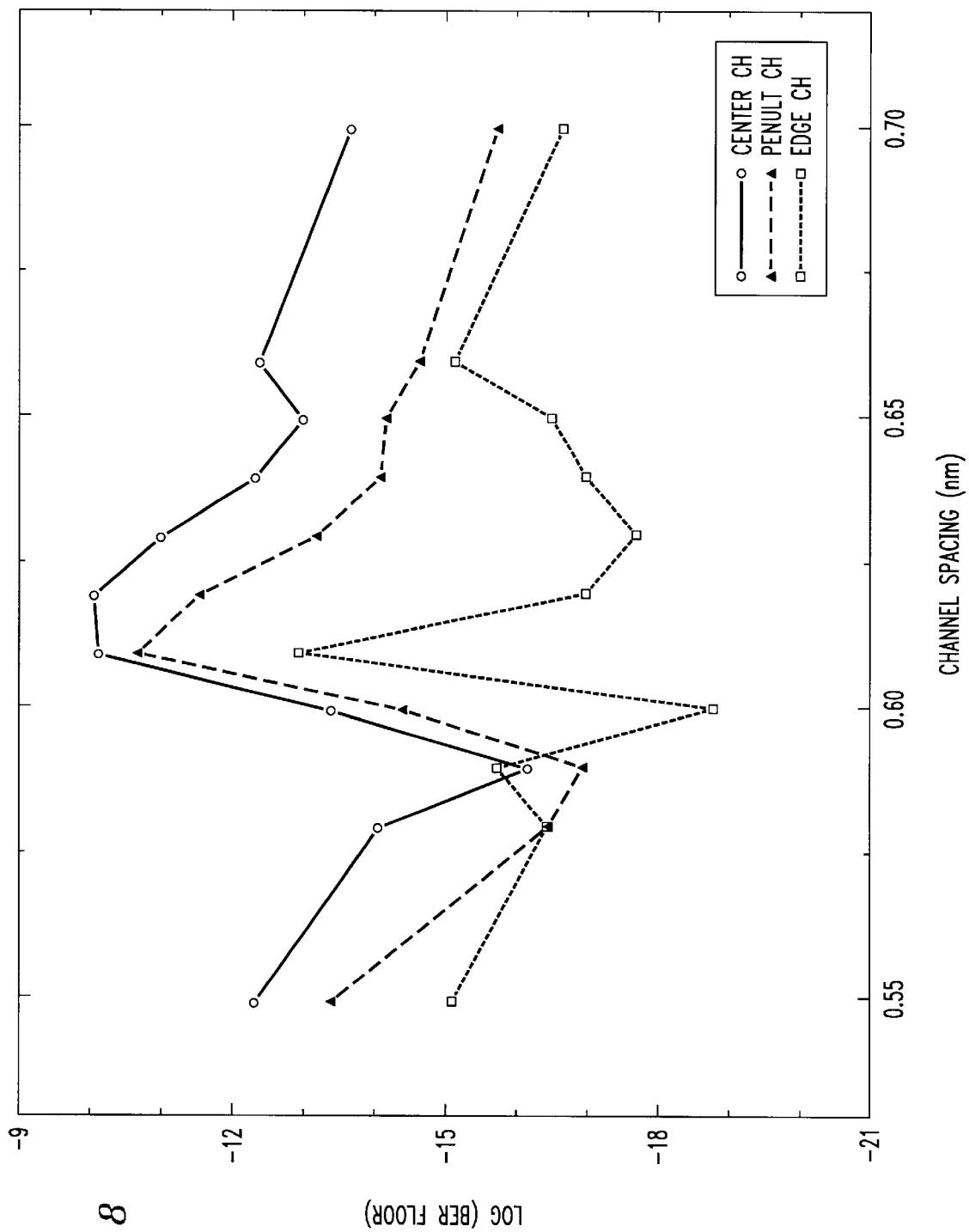
FIG. 8 shows a resonance observed in a five-channel, 624-km system configured as 8×80 km.

Shown in FIG. 8 are the resonances observed in a five-channel, 624-km system configured as 8×80 km. In FIG. 8, the ordinate scale uses an extrapolated BER floor derived from Q measurements of the five-channel CPM system. The system was similar to that of FIG. 4 with the addition of three more channels and elimination of the decorrelator/polarization scrambler. The separation between all five channels was scanned while maintaining equal spacing and +7 dBm/channel into each span. BER floors were extrapolated from Q measurements of the three shortest wavelength channels as the channel spacing was varied from 0.55 nm to 0.70 nm with −20 dBm received optical power. As shown in FIG. 8, all three channels exhibit a clear resonance in CPM impairment at 0.61-nm spacing, while at spacings just 0.02 nm off resonance, Q measurements predict BER floors to be at least two orders of magnitude lower. As expected, the CPM resonance increases with number of neighboring channels, so that the center channel has the broadest resonance and highest on-resonance BER floor ($8 \times 10^{-11}$). The four-wave mixing products generated at these close channel spacings had powers 25 dB lower than the signal on all channels and did not contribute to the observed impairments.

Conclusion

Channel-spacing-dependent resonances have been observed in the CPM impairment in WDM transmission with equal amplifier span lengths. These CPM resonances are a potential problem that must be considered when designing WDM systems with closely spaced channels. The CPM resonances are reduced by mis-matching the amplifier span lengths (and/or dispersion in each span) so an integral number of bit walk-throughs do not occur in successive amplifier spans.

What has been described is merely illustrative of the application of the principles of the present invention. Other arrangements and methods can be implemented by those skilled in the art without departing from the spirit and scope of the present invention.

What is claimed is:

1. A wavelength division multiplexed (WDM) system including a transmitter for sending WDM signal channels over a plurality of serially connected amplified communication spans to a receiver, each span comprising an optical amplifier for receiving the WDM signal channels and transmitting them over a length of fiber to an adjacent span or the receiver, the transmitter or at least one span further comprising means for setting the clock phase difference between at least one pair of adjacent WDM signal channels at the beginning of the fiber in one span to be different from the clock phase difference of said at least one channel pair at the beginning of the fiber in at least one other span.

2. The WDM system of claim 1 wherein a group of spans each have said clock phase difference setting means and wherein the clock phase difference of said at least one channel pair at the beginning of the fiber in any span in said group of spans is different from the clock phase difference of said at least one channel pair at the beginning of the fiber in at least one other of said group of spans.

3. The WDM system of claim 1 wherein a group of spans each have said clock phase difference setting means for setting the clock phase difference for each channel pair of said plurality of channel pairs at the beginning of the fiber in its span to be different from the clock phase difference for each channel pair of said plurality of channel pairs at the beginning of the fiber in any other of said group of spans.

4. The WDM system of claim 1 wherein each of the spans have equal dispersion-length products.

5. The WDM system of claim 1 wherein said clock phase setting means include at least one length of dispersion-compensating fiber added to one of the spans.

6. The WDM system of claim 1 wherein said clock phase difference setting means includes a plurality of the spans with different fiber lengths.

7. The WDM system of claim 1 wherein at the transmitter said clock phase difference setting means sets the wavelength separation between two or more pairs of the WDM signal channels to be different.

8. The WDM system of claim 1 wherein at the transmitter said clock phase difference setting means modulates each of the at least two channels of the WDM signal channels at a different bit rate.

9. The WDM system of claim 1 wherein said clock phase difference setting means includes at least two of the spans containing fiber of different dispersion-length products.

10. The WDM system of claim 1 wherein said clock phase difference setting means includes a fiber delay line.

11. The WDM system of claim 1 wherein said clock phase difference setting means includes a demultiplexer for separating each channel of said at least one channel pair, a separate fiber delay line for delaying each separated channel, and a multiplexer for combining the delayed separated channels.

12. The WDM system of claim 11 wherein said multiplexer and demultiplexer are Mach-Zehnder interferometers.

13. The WDM system of claim 1 wherein said clock phase difference setting means includes a coupler having an input port, an output port, and at least one reflection port connected over an optical path to a reflector, and wherein each channel of said at least one channel pair is reflected from the reflector to the output port with a different delay.

14. The WDM system of claim 1 wherein said clock phase difference setting means is located in said at least one span between the amplifier and its connection to the fiber, or between amplification stages in the amplifier.

15. The WDM system of claim 1 wherein at the transmitter clock phase difference setting means enables the clock phase of a channel modulating data signal used to modulate one channel of said at least one channel pair to be different from the clock phase of a channel modulating data signal used to modulate the other channel of said at least one channel pair.

16. The WDM system of claim 1 further comprising
at one or more spans
means for setting the polarization of one channel of said at least one channel pair to be orthogonal to the polarization of the other channel of said at least one channel pair.

17. The WDM system of claim 1 wherein each channel of said at least one channel pair is modulated using a return-to-zero modulation and wherein each channel of said at least one channel pair is modulated 180 degrees out of clock phase alignment to an adjacent channel.

18. In a wavelength division multiplexed (WDM) system including a transmitter for sending WDM signal channels over a plurality of serially connected amplified communication spans to a receiver, each span including an optical amplifier for receiving the WDM signal channels and transmitting them over a length of fiber to an adjacent span or the receiver, a method of reducing the cross-phase modulation (CPM) between at least one pair of adjacent WDM signal channels, comprising the steps of:
at the receiver, measuring bit error rate (BER) at one or more channels of said at least one pair of adjacent WDM signal channels and
at one or more spans, adjusting the clock phase difference between channels of said at least one pair of adjacent WDM signal channels to minimize the measured BER at said one or more channels.

19. In a wavelength division multiplexed (WDM) system including a transmitter for sending WDM signal channels over a plurality of serially connected amplified communication spans to a receiver, each span including an optical amplifier for receiving the WDM signal channels and transmitting them over a length of fiber to an adjacent span or the receiver, a method of reducing the cross-phase modulation (CPM) between at least one pair of adjacent WDM signal channels, comprising the steps of:

at at least one span, determining the clock phase difference between said at least one pair of adjacent WDM signal channels at that span and at a different span, determining and adjusting the clock phase difference between said at least one pair of adjacent WDM signal channels to be different from the clock phase difference of said at least one pair of adjacent WDM signal channels at each of said at least one span.

20. In a wavelength division multiplexed (WDM) system including a transmitter for sending WDM signal channels over a plurality of serially connected amplified communication spans to a receiver, each span including an optical amplifier for receiving the WDM signal channels and transmitting them over a length of fiber to an adjacent span or the receiver, a method of reducing the cross-phase modulation (CPM) between at least one pair of adjacent WDM signal channels, comprising the steps of:

determining the variation in clock phase differences at a fiber input of one or more spans and at the transmitter, adjusting the clock phase of a channel modulating data signal used to modulate one channel of said at least one channel pair to reduce cross-phase modulation.

21. A wavelength division multiplexed (WDM) system including a transmitter for sending WDM signal channels over at least one amplified communication span to a receiver, said at least one span comprising an optical amplifier for receiving the WDM signal channels and transmitting them over a length of fiber to an adjacent span or the receiver, said at least one span further comprising means for setting the difference in propagation delay, $\Delta\tau$, for at least one channel pair of said WDM signal channels in any span so that $(n+0.25)T<\Delta\tau<(n+0.75)T$, where T is the bit period of a channel modulating data signal, and n is a non-negative integer.

22. In a wavelength division multiplexed (WDM) system including a transmitter for sending WDM signal channels over at least one amplified communication span to a receiver, said at least one span including an optical amplifier for receiving the WDM signal channels and transmitting them over a length of fiber to an adjacent span or the receiver, a method of reducing the cross-phase modulation (CPM) at at least one pair of adjacent WDM signal channels, comprising the steps of:

determining the differential time delay in one or more spans and adjusting the difference in propagation delay, $\Delta\tau$, for at least one channel pair of said WDM signal channels in any span so that $(n+0.25)T<\Delta\tau<(n+0.75)T$, where T is the bit period of a channel modulating data signal, and n is a non-negative integer.

23. A wavelength division multiplexed (WDM) system including a transmitter for sending WDM signal channels, having a known bit rate, over one or more amplified communication spans, having known channel spacings, to a receiver, each span including an optical amplifier for receiving the WDM signal channels and transmitting them over a length of fiber to an adjacent span or the receiver, at least one span comprising means for adjusting said at least one span to have a propagating delay difference, $\Delta\tau$, for adjacent channels in the range $(n+0.25)T$ to $(n+0.75)T$, where T is the bit period of a channel modulating data signal, and n is a non-negative integer, said adjusting means controlling said propagating delay difference, using apparatus for providing one or more of the following functions
1) selecting the fiber length;
2) selecting the fiber dispersion;
3) adding adjustable differential delay; and
4) adding a length of dispersion compensating fiber.

24. In a wavelength division multiplexed (WDM) system including a transmitter for sending WDM signal channels, having a known bit rate, over a plurality of serially connected amplified communication spans, having a known channel spacing, to a receiver, each span including an optical amplifier for receiving the WDM signal channels and transmitting them over a length of fiber to an adjacent span or the receiver, a method of reducing the cross-phase modulation (CPM) between at least one pair of adjacent WDM signal channels, comprising the steps of:

at the receiver, determining a difference in propagation delay between at least one pair of adjacent WDM signal channels and adjusting said at least one span to have a propagation delay difference for adjacent channels in the range $(n+0.25)T$ to $(n+0.75)T$, where T is the bit period of a channel modulating data signal, and n is a non-negative integer, said adjusting step using one or more of the following procedures
1) selecting the fiber length;
2) selecting the fiber dispersions;
3) adding adjustable differential delay; and
4) adding a length of dispersion compensating fiber.

* * * * *